Oct. 11, 1932.  O. N. GREDELL  1,881,508
PIPE COUPLING
Filed Oct. 26, 1931
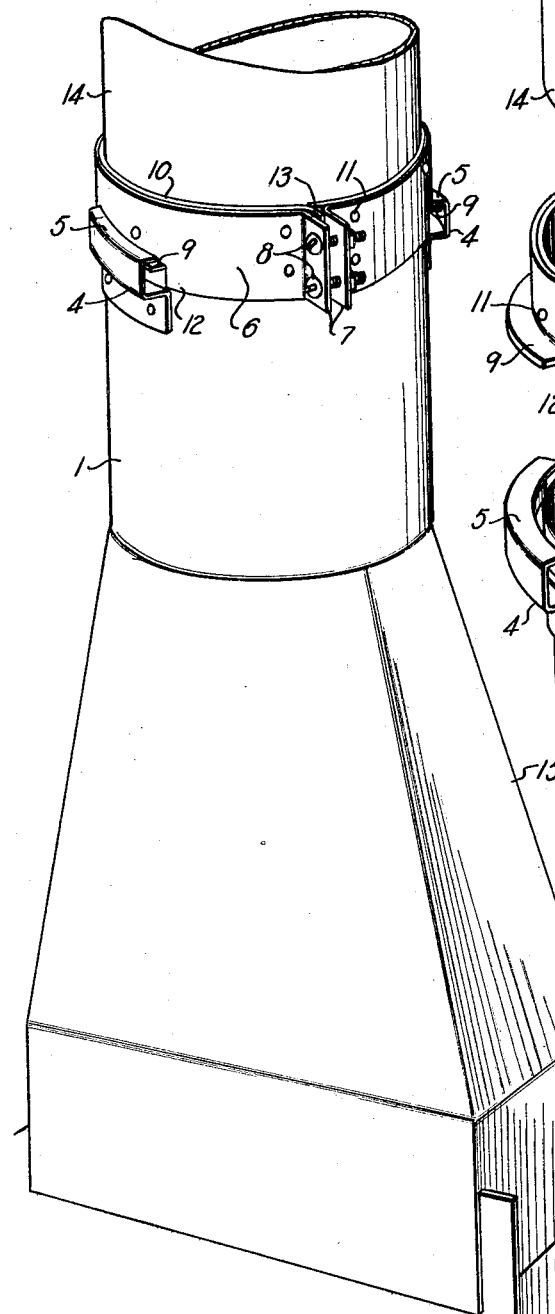
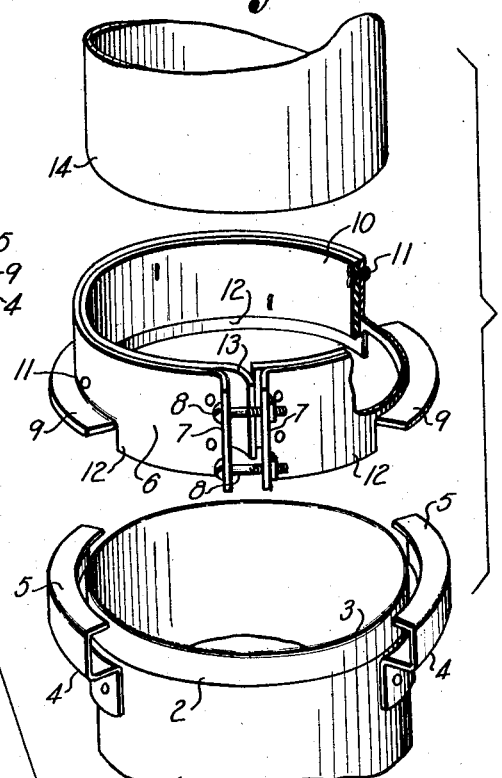
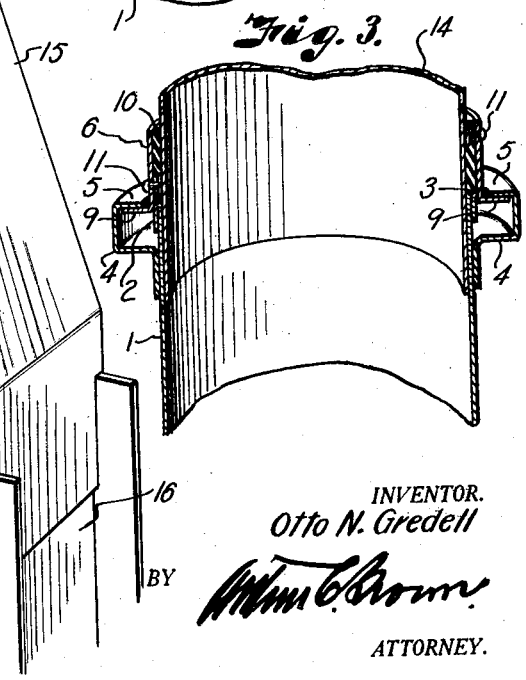
INVENTOR.
Otto N. Gredell
BY
ATTORNEY.

Patented Oct. 11, 1932

1,881,508

UNITED STATES PATENT OFFICE

OTTO N. GREDELL, OF KANSAS CITY, MISSOURI, ASSIGNOR TO STANDARD STEEL WORKS, OF NORTH KANSAS CITY, MISSOURI, A CORPORATION OF MISSOURI

PIPE COUPLING

Application filed October 26, 1931. Serial No. 571,001.

This invention relates to pipe couplings, and more particularly to adjustable couplings for sheet metal pipe sections or conduits, and has for its principal object to provide a coupling whereby the pipe sections may be quickly and securely adjusted for length and rotative relation to each other.

Other important objects of the invention are to provide a relatively flexible connection to enable the pipe sections to follow a desired curvature and to provide a dust tight, telescopic connection between the pipe sections.

In accomplishing these and other objects of my invention, I have provided improved details of structure, the preferred forms of which are illustrated in the accompanying drawing, wherein:

Fig. 1 is a perspective view of my coupling showing the same on the delivery pipe of a feed mill.

Fig. 2 is a disassembled view of the coupling and adjacent pipes with a part broken away and in section.

Fig. 3 is a perspective view of the coupling in operative position, parts being broken away and in section, showing the gasket in sealing position.

Referring to the drawing in detail:

1 represents a pipe section which has one end crimped retractively over the end thereof to form a collar 2 providing a relatively wide end edge 3 which serves as a gasket seat, as will be hereinafter more fully described.

Secured to the pipe section 1 and preferably diametrically opposite each end are circumferentially spaced arcuate, hook-shaped locking members 4 which have upper flanges 5 arranged to permit the passage of a contractile coupling band 6.

The coupling band 6 has its ends bent outwardly so as to form ears or flanges 7 which are provided with openings for the reception of bolts 8 by means of which the band is clamped in position on an adjoining pipe section.

One edge of the band 6 is slitted and the portion of the band between adjacent slits is turned outwardly, forming wings 9 which occupy the same circumferentially spaced positions on the band 6 as do the hooks 4 on the pipe section 1.

A resilient gasket 10 is applied to the inside of the band 6 and is preferably secured by suitable fastening means which may be rivets 11. This gasket is of less width than the band and is so located that its lower edge will not extend below the plane of the wings 9, leaving the portion 12 of the band projecting below the edge of the packing to contact the end of the collar 2. The ends 13 of the gasket are bent outwardly and project between the ears 7 which enables it to fit snugly around the adjacent pipe section 14 which is designed to be slipped into the pipe section 1.

The pipe section 1 may be attached to a hood 15 as shown in Fig. 1, which, in this instance, is placed over the delivery end 16 of a feed mill.

A manner of attaching my coupling is as follows:

The bolts 8 are first passed through the openings in the flanges 7 and the nuts on the bolts drawn up, giving the band a cylindrical form, the bolts only being tightened sufficiently to permit the collar to slip freely over the pipe section 14. The end of the pipe section 14 is then telescoped inside of the pipe section 1 until the combined length of the pipe sections are of the length desired. The band is then slid over the collar portion 2 of the pipe section 1 until the lower edge of the gasket is compressed against the upper edge of the collar, the flanges 9 entering the space between the locking members 4.

The band is then turned so that the wings 9 pass under the flanges 5 of the locking members 4 and interlock therewith, which draws the gasket tightly to the seat 3. The bolts 8 are then tightened, drawing the band closely around the pipe 14, thus frictionally holding the same on the pipe and preventing longitudinal movement thereof. By having the ends 13 of the gasket 10 turned outwardly, as disclosed in Figs. 1 and 2, I am enabled to obtain a very snug fit around the pipe and have no appreciable opening at the point where the gasket comes together. This feature and the seating of the gasket edge on the seat 3 makes the connection leak and sift-proof for all practical purposes.

It is to be particularly noted that when the wings 9 and hooks 4 are interlocked, the coupling band has its edge adjacent the wings 9, and which, for convenience, may be termed its lower edge, held in sealing contact with the seat 3 on the end of the thimble.

It is also to be understood that, instead of the wings 9, outwardly extending members may be secured to the band without departing from the spirit of my invention.

What I claim and desire to secure by Letters Patent is:

1. A pipe coupling for connecting adjoining pipe sections comprising a contractile coupling band sleeved on one of the pipe sections, a gasket carried by said band and adapted to be seated on the end of the other pipe section, and means for detachably securing said band to said sections.

2. A pipe coupling for connecting adjoining pipe sections comprising a gasket seat on one of said pipe sections, a coupling band adapted to surround said sections at said seat, means for drawing said band around said sections, a gasket secured to said band and adapted to have one edge rest on said seat, and means for detachably securing said band against longitudinal movement on said pipe sections.

3. A pipe coupling for connecting adjoining pipe sections comprising a collar around one end of one of the sections, a contractile band surrounding said collar and the adjoining section, a gasket associated with said band and adapted to have an edge contact the end of said collar, means for contracting said band, and interlocking means carried by one of said pipe sections and band for securing the same against separation from each other.

4. In a pipe coupling, a gasket, a contractile band for surrounding the adjoining ends of pipe sections to be secured together, a gasket carried by said band sealingly contacting one of the pipe sections and having its lower edge to sealingly contact the end of the other pipe section, and interlocking means associated with said band for retaining said gasket in sealing contact with said pipe sections.

5. In a pipe coupling, a substantially cylindrical band having outwardly bent ends, means passing through said ends for drawing the same toward each other, outwardly extending circumferentially spaced wings carried by said band adjacent one edge thereof, a gasket located on the inner face of said band, and locking members adapted to be secured to a pipe section adjacent one of its ends in circumferentially spaced relation to each other, said members adapted for engagement with said wings for securing said band on said pipe section.

6. In a pipe coupling, a band bent into substantially cylindrical form and having its ends spaced apart and bent outwardly, means for drawing said ends toward each other, a resilient gasket of less width than said band secured to the inner face thereof and having its ends extending between the outwardly bent ends of the band, circumferentially spaced outwardly extending members secured to the outer face of said band adjacent its lower edge, and locking members adapted to be secured in circumferentially spaced relation to a pipe section adjacent one of its ends, said locking means adapted for engagement with said outwardly extending members on the band, whereby said band and pipe section may be secured together.

7. A pipe coupling for connecting adjoining pipe sections comprising a contractile band surrounding one of the pipe sections, a gasket associated with said band, means for contracting said band to tighten the gasket about said pipe section, and interlocking means carried by the other of said pipe sections and said band for securing the pipe sections together.

8. A pipe coupling for connecting adjoining pipe sections, a contractile coupling band sleeved on one of the pipe sections, a gasket carried by said band and adapted to be seated on the end of the other pipe section, means for detachably securing said band to one of said pipe sections, and means for clamping the coupling band about the other of said sections to compress the gasket into sealing engagement with said pipe sections.

9. A pipe coupling for connecting telescoping pipe sections comprising a contractile coupling band sleeved on the inner pipe section, a gasket carried by said band and adapted to be seated on the end of the other pipe section, and means for detachably securing said band to said sections.

In testimony whereof I affix my signature.

OTTO N. GREDELL.